(12) United States Patent
Lin (10) Patent No.: US 7,206,365 B2
(45) Date of Patent: Apr. 17, 2007

(54) DECISION SEQUENCE GENERATING METHOD AND ASSOCIATED RECEIVER WITH A DECISION FEEDBACK EQUALIZER

(75) Inventor: Chan-Shih Lin, Taipei (TW)

(73) Assignee: Via Technologies Inc (TW)

( * ) Notice: Subject to any disclaimer, the term of this patent is extended or adjusted under 35 U.S.C. 154(b) by 741 days.

(21) Appl. No.: 10/350,590

(22) Filed: Jan. 24, 2003

(65) Prior Publication Data
US 2004/0146129 A1   Jul. 29, 2004

(51) Int. Cl.
*H03D 1/06* (2006.01)
*H04L 1/00* (2006.01)

(52) U.S. Cl. ............... 375/348; 375/347; 375/349; 375/350; 370/208

(58) Field of Classification Search ............ 375/348, 375/347, 340, 267, 350, 229, 343, 140, 142, 375/144, 148, 150, 130, 240, 141; 370/208
See application file for complete search history.

(56) References Cited

U.S. PATENT DOCUMENTS

| | | | | |
|---|---|---|---|---|
| 6,233,273 B1* | 5/2001 | Webster et al. | ............. | 375/148 |
| 6,614,836 B1* | 9/2003 | Halford et al. | ............. | 375/152 |
| 6,982,946 B2* | 1/2006 | Wiberg et al. | ............. | 370/208 |
| 2003/0069025 A1* | 4/2003 | Hoctor et al. | ............. | 455/456 |
| 2003/0201932 A1* | 10/2003 | Rabinowitz et al. | ... | 342/357.09 |
| 2004/0096017 A1* | 5/2004 | Holt et al. | ............. | 375/343 |
| 2004/0131109 A1* | 7/2004 | Kim et al. | ............. | 375/148 |

* cited by examiner

*Primary Examiner*—Mohammed Ghayour
*Assistant Examiner*—Qutub Ghulamali (57) ABSTRACT

A decision sequence generating method and an associated receiver with a decision feedback equalizer (DFE) are provided. The receiver can mitigate multi-path distortion generated when data is transmitted through a multi-path channel, wherein the data is encoded into codewords, each of which comprises N chips. The receiver comprises a decision generator for generating N−1 chip decisions corresponding to first N−1 chips of a received codeword and for producing a codeword decision corresponding to the whole received codeword; and a feedback filter for reconstructing post-cursor section of the multi-path channel impulse response. The decision sequence generating method comprises sending the N−1 chip decisions into the feedback filter in order, producing the codeword decision after collecting all N chips of the received codeword, and then providing the codeword decision to the feedback filter to replace the N−1 chip decisions sent previously, thereby reconstructing the post-cursor section of the channel impulse response with more confidence.

8 Claims, 5 Drawing Sheets

DECISION SEQUENCE GENERATING METHOD AND ASSOCIATED RECEIVER WITH A DECISION FEEDBACK EQUALIZER

BACKGROUND OF THE INVENTION

1. Field of the Invention

The present invention relates in general to the field of signal processing in communication systems, and more particularly to a decision sequence generating method that can enable an associated receiver containing a decision feedback equalizer (DFE) to generate a decision based on a whole codeword to replace chip decisions generated previously, thereby reconstructing post-cursor section of channel impulse response more precisely.

2. Description of the Prior Arts

Wireless local area network (WLAN) is one of the most popular and fast-developed technologies, and the new WLAN-related specifications and standards are proposed quickly. However, The application of WLANs for high-speed and reliable wireless communication has many problems to overcome, one critical issue of these problems is multi-path distortion. Because there exists various transmission paths in the channel between the transmitter and the receiver in a wireless communication system, inter-symbol interference (ISI) and exponentially decayed multi-path effect of transmitted signals received by the receiver are generated.

In WLAN systems, data is transmitted in the form of codewords. Each codeword is composed of N chips, and N is an integer. The total number of the codewords used in a codeword set and the chip number N of a codeword are determined by the specific operation mode of communication which the system employs. The multi-path distortion mentioned above includes inter-symbol interference (ISI) and inter-chip interference (ICI, or called intra-symbol interference).

Figure 1:
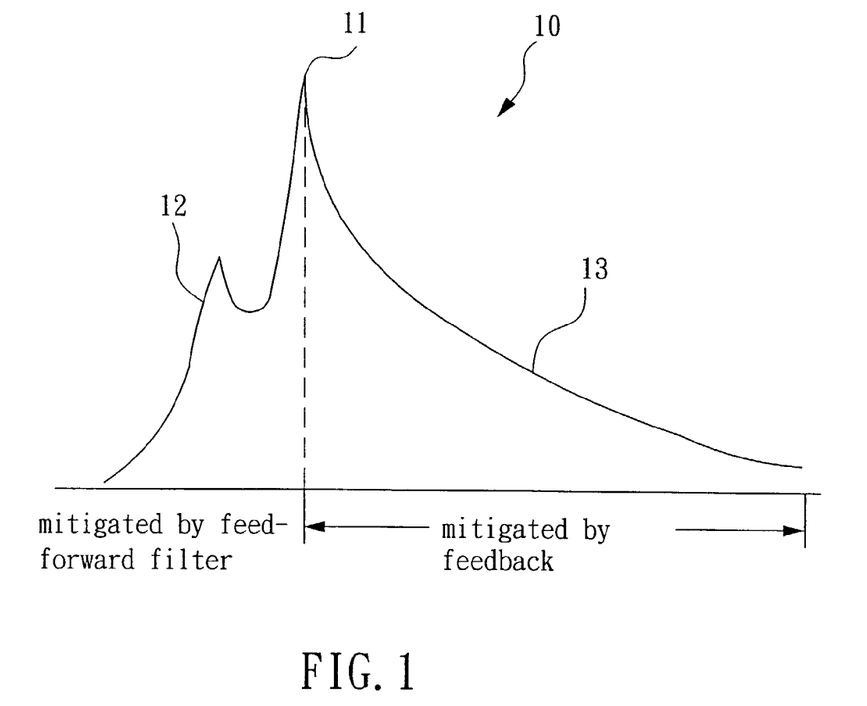
FIG. 1 is a diagram depicting a common multi-path channel impulse response characteristic.

FIG. 1 shows a multi-path channel impulse response characteristic 10. As shown in FIG. 1, we can divide the channel impulse response into three sections: (1) peak section 11, which has the maximum energy that we want to reserve; (2) pre-cursor section 12, which appears before the peak 11 and usually has a shorter length; and (3) post-cursor section 13, which appears after the peak 11 and usually has a long decay "tail" on the impulse response characteristic 10, wherein the pre-cursor section 12 and post-cursor section 13 are the main cause of the ISI and ICI.

Typically, a DFE is applied in a receiver of a wireless communication system to remove these "non-ideal" sections of the channel impulse response, and then ICI and ISI generated by transmission through the multi-path channel would be mitigated effectively.

Figure 2:
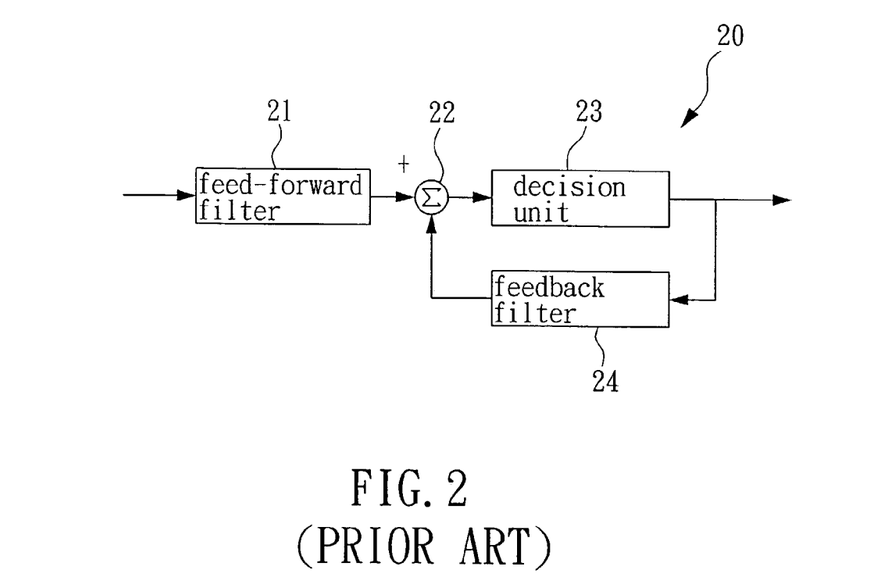
FIG. 2 is a block diagram of a conventional decision feedback equalizer (DFE).

FIG. 2 shows a block diagram of a conventional DFE. As shown in FIG. 2, DFE 20 comprises: a feed-forward filter 21, an adder 22, a decision unit 23 and a feedback filter 24, wherein the feed-forward filter 21 and the feedback filter 24 are used to remove the pre-cursor section 12 and the post-cursor section 13 respectively.

The signal processing flow for the DFE 20 comprises the following steps:

(1) Provide a chip received by the receiver to the feed-forward filter 21 to remove the effect caused by the pre-cursor section 12 from the chip.

(2) Send the chip into the adder 22 and subtract the re-constructed post-cursor section 13 from the feedback filter 24. The feedback filter 24 is comprised of a tap-delay line and well-trained post-cursor channel coefficients.

(3) Functionally, the DFE 20 is used to remove the part of the inter-symbol and intra-symbol interference, which is estimated based on previously detected symbols, from the current chip. The corrected chip is then sent into the decision unit 23.

(4) At last, the decision unit 23, which contains a limiter, determines a chip decision for the corrected chip, and then sends it to the feedback filter 24 and other devices for subsequent processing.

However, the operation of the conventional DFE 20 is chip-based and needs a higher signal-to-noise ratio (SNR) environment to operate effectively. If SNR is not high enough, incorrect decisions will be made by the decision unit 23, and then propagate down the feedback filter 24. It's very probable to impact the accuracy of all subsequent chip decisions because of only a few wrong chip decisions.

In order to mitigate the serious error-propagation problem mentioned, the present invention provides a decision sequence generating method and an associated receiver with a DFE. Besides operating in chip-based way, the decision sequence generating method can enable the DFE to generate a decision based on a whole codeword to replace chip decisions provided to a feedback filter of the DFE previously, thereby reconstructing the post-cursor section of channel impulse response with more confidence.

SUMMARY OF THE INVENTION

The objective of the present invention is to provide a receiver with a decision feedback equalizer (DFE), wherein the DFE is used to mitigate multi-path distortion generated in a communication system when data is transmitted in a multi-path channel. The transmitted data is encoded into a form of codewords, each of which is selected from a codeword set and comprises N chips wherein N is a positive number. The receiver comprises: a feed-forward filter for receiving and filtering a codeword of the transmitted data; a codeword correlator for calculating correlation between the received codeword and any codeword of the codeword set; a peak detector for selecting a maximum output from the codeword correlator; a differential combiner for receiving a post-cursor representative echo signal as an estimate of the multi-path channel impulse response and for subtracting the post-cursor representative echo signal from the output of the feed-forward filter; a decision generator, coupled to the peak detector and the codeword correlator, for generating N chip decisions corresponding to N chips of the received codeword and one codeword decision corresponding to the received codeword; and a feedback filter for generating the post-cursor representative echo signal based on the output of the decision generator.

The major feature of the above receiver is that the decision generator therein provides a corresponding one of the N chip decisions to the feedback filter if the decision generator receives an i-th chip, i=0~N−2, of the received codeword, and provides the codeword decision to the feedback filter, if the decision generator receives an N-th chip of the received codeword, to replace the corresponding chip decisions sent to the feedback filter previously.

Another objective of the present invention is to provide a decision sequence generating method for the above receiver. The method comprises the following steps:

(a) receiving and sending a chip of a codeword into the decision generator;

(b) generating a chip decision based on the received chip and sending the chip decision to the feedback filter if M chips of the codeword have been received, and then returning to step (a), wherein M is less than N;

(c) performing a codeword synthesis procedure based on N chips of the codeword to synthesize a codeword decision if the N chips of the codeword have been received; and (d) providing the codeword decision to the feedback filter to replace the N−1 chip decisions sent previously in step (b).

DETAILED DESCRIPTION OF THE PRESENT INVENTION

This section will provide a detailed description with two preferred embodiments and appended drawings to make the goals and features of the present invention more apparent and easy to understand.

Figure 3:
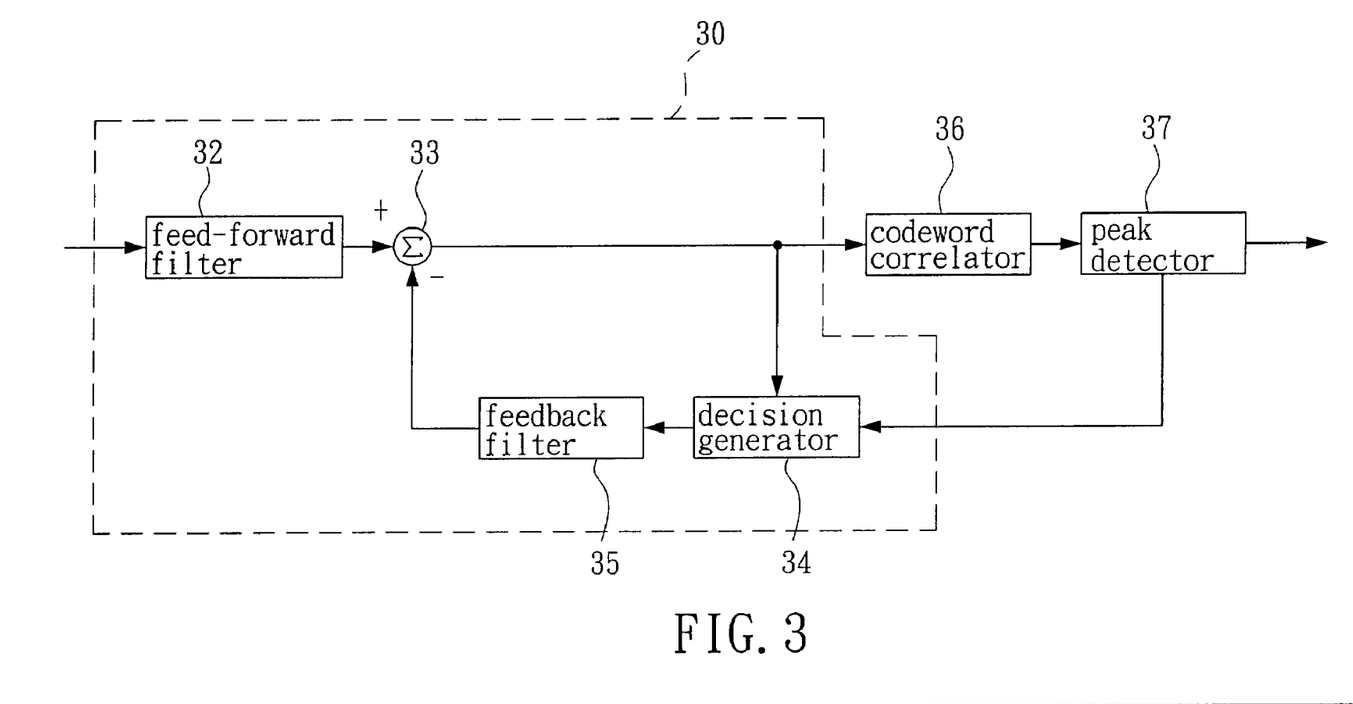
FIG. 3 is a block diagram of a signal processing architecture containing a DFE of the present invention.

FIG. 3 shows a block diagram of a signal processing architecture containing a decision feedback equalizer (DFE) according to the present invention. The signal processing architecture is applied to a receiver of a wireless communication system, such as a RAKE receiver of an indoor WLAN, wherein the receiver includes a DFE 30 used to mitigate multi-path distortion generated in the wireless communication system when data signals are transmitted through a multi-path channel, and the data is encoded into codewords wherein each codeword is selected from a codeword set and comprises N chips. The DFE 30 comprises a feed-forward filter 32, a decision generator 34, a feedback filter 35 and a differential combiner 33 coupled to the output terminal of the feedback filter 35 and the output terminal of the feed-forward filter 32. The decision generator 34 generates N−1 chip decisions corresponding to first N−1 chips of a codeword received by the receiver respectively and generates a codeword decision based on a related index provided from a peak detector 37 of the FIG. 3. The feedback filter 35, coupled to the output terminal of the decision generator 34, re-constructs the post-cursor section of the multi-path channel impulse response. The decision generator 34 sends the N−1 chip decisions into the feedback filter 35 in predetermined generation order in a normal-mode, and then provides the codeword decision to the feedback filter 35 in a codeword-correlated mode to replace the corresponding first N−1 chip decisions sent into the feedback filter 35 previously.

The feed-forward filter 32 is used to remove the pre-cursor section of the multi-path channel impulse response. The differential combiner 33 is used to subtract the output of the feedback filter 35 from the output of the feed-forward filter 32 and provides the result of the subtraction as a received chip to the decision generator 34.

The signal processing architecture in FIG. 3 further comprises a codeword correlator 36 and a peak detector 37. The codeword correlator 36 is coupled to output of the differential combiner 33 and calculates the correlation between each codeword of the codeword set and the received codeword, wherein the codeword correlator 36 performs the correlation calculation after collecting a complete codeword (i.e. N chips). The way to implement the codeword correlator 36 is not limited. However, in order to save cost of hardware circuit and increase calculating speed, it is preferred to implement the codeword correlator 36 as performing fast Hadamard transform (FHT). FHT is well known in the art and not directly concerned with the present invention, thus no more description will be provided here.

The peak detector 37, coupled to the codeword correlator 36 and the decision generator 34, is used to select the maximum output of the codeword correlator 36 and then to generate the related index. Besides, output of the peak detector 37 is just the codeword that has the maximum correlation with the codeword transmitted by a transmitter of the system (i.e. the maximum-likelihood codeword), and it is provided to other devices (not shown in FIG. 3) of the receiver for subsequent processing. This portion is irrelevant to the present invention and will not be explained here.

Therefore, a processing flow for the signal processing architecture is as follows: providing a chip of a codeword received by the receiver to the feed-forward filter 32 for removing the pre-cursor section from the chip; next, sending the chip into the differential combiner 33 and subtracting from it the re-constructed result of the post-cursor section from the feed-back filter 35, wherein the subtracting result is the chip whose distortion caused by the pre-cursor section and the post-cursor section has been removed; and at last, providing the corrected chip to the decision generator 34 and the codeword correlator 36 respectively, wherein the decision generator 34 generates the chip decision (i.e. the normal-mode) and the maximum-likelihood codeword (if N chips of the codeword have been collected, i.e. the codeword-correlated mode) corresponding to the provided chip and the related index respectively, where the related index is obtained after the operation of the codeword correlator 36 and the peak detector 37, and then sends these decisions into the feedback filter 35 for re-constructing the post-cursor section and feeding back the result to the differential combiner 33 for eliminating the ISI and ICI effectively.

The major technical feature of the DFE 30 lies in using the codeword decision generated by the decision generator 34 to replace the chip decisions sent into the feedback filter 35 previously, thereby re-constructing the post-cursor section with more confidence. This is because the codeword decision is the maximum-likelihood codeword selected based on a "whole" codeword, and the chip decision is generated only based on one single chip by a limiter with less accuracy. Next, two preferred embodiments are provided to describe the implementation details of the DFE 30.

<First Embodiment>

Figure 4:
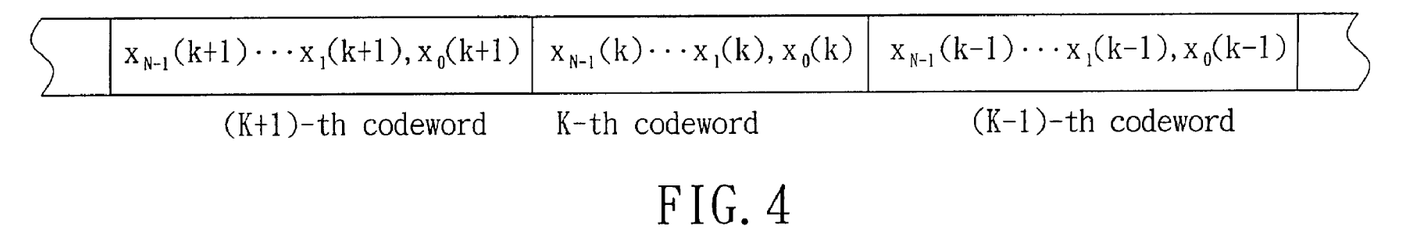
FIG. 4 is a diagram of a portion of a codeword sequence received by a receiver of a wireless communication system.
Figure 5:
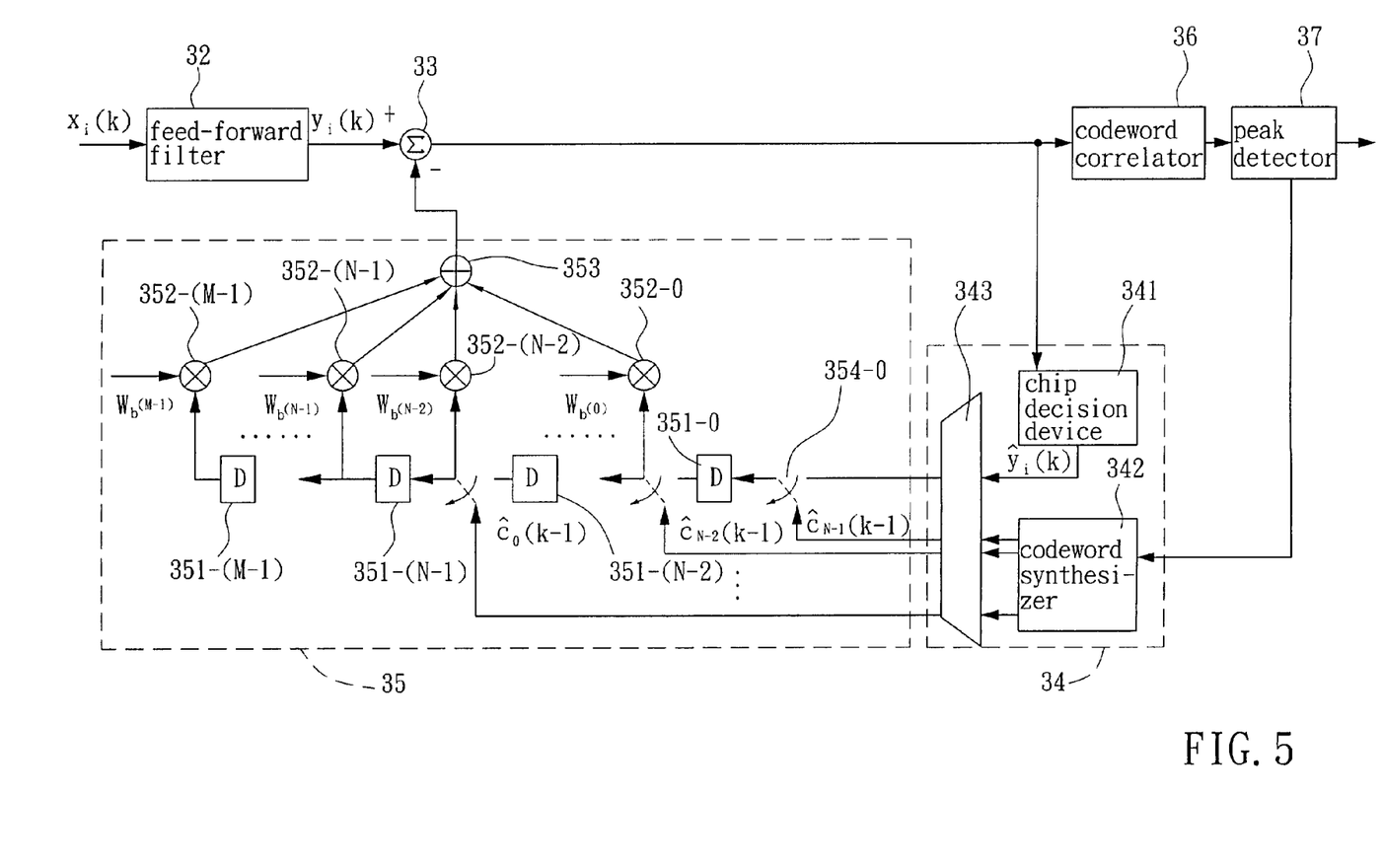
FIG. 5 is a block diagram illustrating a signal processing architecture of the first embodiment of the present invention for depicting details of the DFE of FIG. 3.

FIG. 4 shows a diagram of a portion of a codeword sequence received by a receiver of a wireless communication system. As shown in FIG. 4, each codeword includes N chips, wherein $x_i(k)$ represents the i-th chip of the k-th codeword. FIG. 5 shows a block diagram illustrating a signal processing architecture of the first embodiment of the present invention for depicting the details of the DFE 30. The decision generator 34 comprises a chip decision device 341 for generating N−1 chip decisions corresponding to the first N−1 chips of a received codeword, i.e. $\hat{y}_i(k)$, i=0~N−2, wherein i is the chip index and k is the codeword index, and the chip decision could be a floating-point value. The decision generator 34 further comprises a codeword synthesizer 342 having N outputs (i.e. $\hat{c}_i(k-1)$, i=0~N−1) for synthesizing a codeword decision based on a related index of the received codeword. The decision generator 34 further comprises a switching device 343, coupled to the output of the chip decision device 341 and the N outputs of the codeword synthesizer 342, for toggling between the normal mode and the codeword-correlated mode. The feedback filter 35 comprises an M serially-connected taps delay line, M multipliers 352-i, i=0~M−1, an adder 353 and N switches 354-i, i=0~N−1 and N>M, wherein the M serially-connected taps 351-i, i=0~M−1 corresponds to the M multipliers 352-i, i=0~M−1 respectively. Each multiplier 352-i performs multiplication of the value of corresponding tap 351-i and an associated well-trained post-cursor channel coefficient $W_h(i)$ i=0~M−1. The adder 353 coupled to the M multipliers 352-i, i=0~M−1 sums up outputs of all the M multipliers 352-i. Each of the N switches 354-i, i=1~N−1 toggles between the previous tap 351-i, i=0~N−2 and the switching device 343 during different modes. During the normal mode, the switching device 343 switches to the chip decision device 341 and sends a chip decision through the switch 354-0 to the tap 351-0; the N switches 354-i, i=1~N−1 switch to the tap 351-i, i=0~N−2 to receive the value of the previous tap. During the codeword-correlated mode, the codeword synthesizer 342 synthesizes a codeword decision $\hat{c}_i(k-1)$, i=0~N−1. The N switches 354-i, i=1~N−1 change to the switching device 343, and the switching device 343 switches to the codeword synthesizer 342 to send the corresponding N chips of the codeword decision therefrom into the tap 351-i, i=0~N−1 respectively, wherein the first N−1 chips from the codeword synthesizer 342 are used to replace the previous N−1 chip decisions $\hat{y}_i(k)$, i=0~N−2 sent to the taps 351-i, i=1~N−1 at the moment, and the N-th chip from the codeword synthesizer 342 is sent into the tap 351-0 through the switch 354-0. This implementation will replace the previous chips with $\hat{c}_i(k-1)$, i=0~N−1 generated by the maximum-likelihood rule and mitigate the error propagation happened in the conventional decision feedback equalizer in low SNR environment.

<Second Embodiment>

Figure 6:
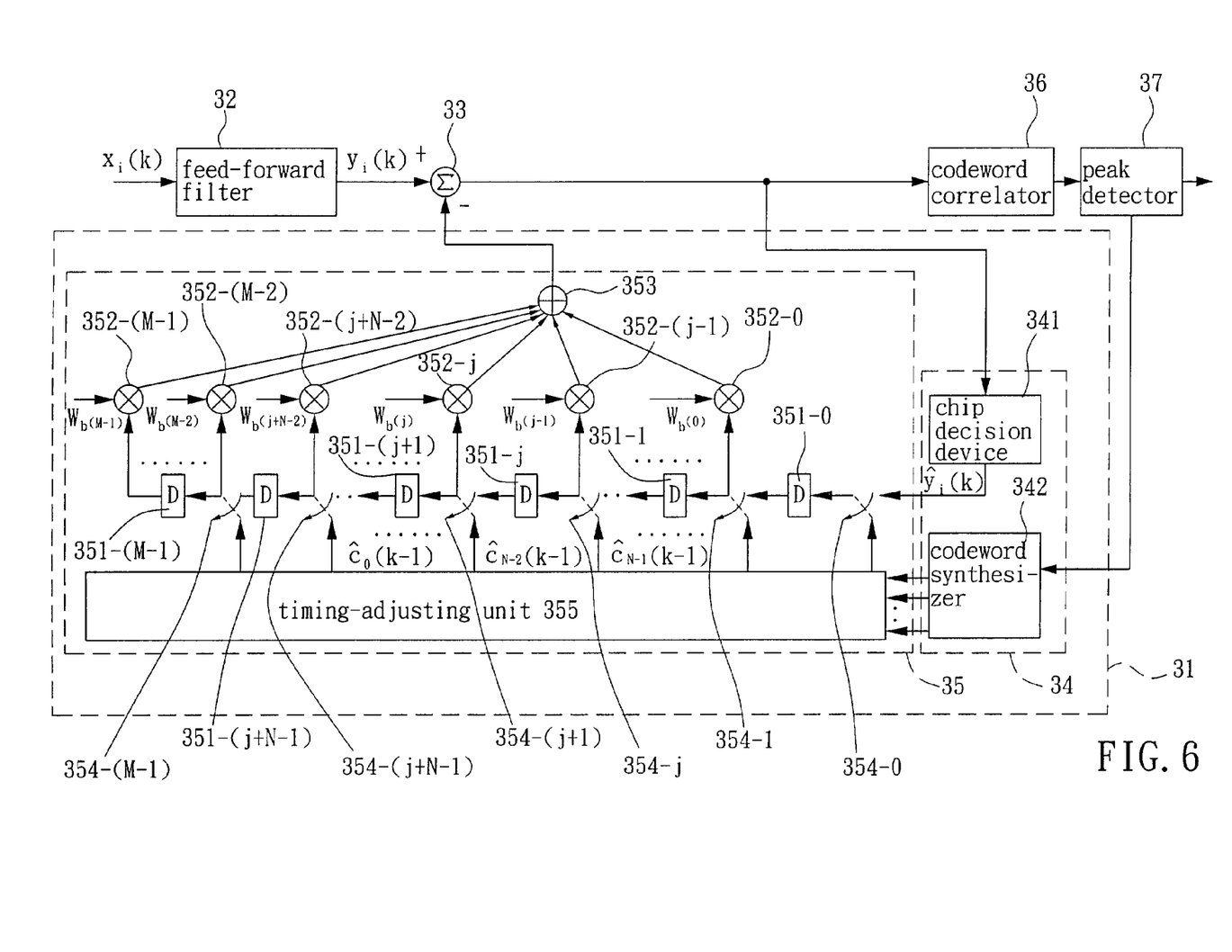
FIG. 6 is a block diagram illustrating the details of the DFE of FIG. 3 according to the second embodiment of the present invention.

In the real world, the codeword correlator 36, the peak detector 37 and the codeword synthesizer 342 will require some computation effort (i.e. clock cycles) to generate the maximum-likelihood codeword $\hat{c}_i(k-1)$, i=0~N−1. The time delay consideration for these blocks is considered in the second embodiment. FIG. 6 shows a block diagram illustrating the details of the DFE 30 as shown in FIG. 3. The major difference between the first and the second embodiments is that the switching device 343 in FIG. 5 is removed from the decision generator 34 and a timing-adjusting unit 355 is added into the feedback filter 35 instead. As shown in FIG. 6, the timing-adjusting unit 355 is used to adjust the timing of each tap 351-i, i=j~j+N−1, wherein j, adjustable by the timing-adjusting unit 355, is the computation effort (clock cycles) needed from the codeword correlator 36 through the peak detector 37 to the codeword synthesizer 342. N switches 354-i, i=j~j+N−1 toggle between the corresponding output 355-i and the taps 351-i, i=j~j+N−1 during the different modes. During the normal mode, the chip decision device 341 sends the chip decisions $\hat{y}_i(k)$, i=0~N−1 into the tap 351-0 in order; the N switches 354-i, i=j~j+N−1 switch to the tap 351-i, i=j~j+N−1 to receive the tap value therefrom. During the codeword-correlated mode, the codeword synthesizer 342 synthesizes the codeword decision $\hat{c}_i(k-1)$, i=0~N−1. The N switches 354-i, i=j~j+N−1 change to the timing-adjusting unit 355 to receive the N chips of the codeword decision, thereby replacing the N chip decisions $\hat{y}_i(k)$, i=0~N−1 sent into the feedback filter 35 previously.

Figure 7:
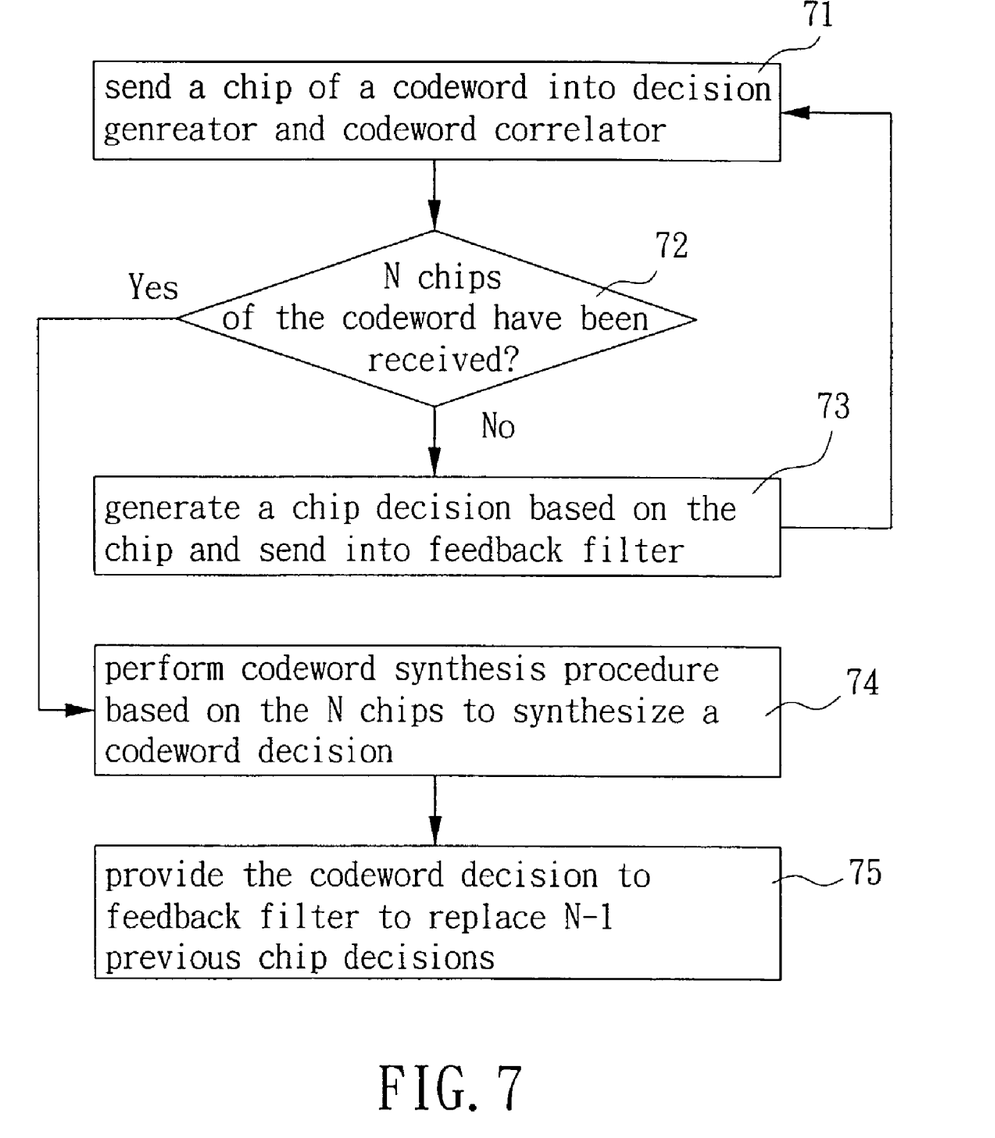
FIG. 7 is a flow chart of the decision sequence generating method for the signal processing architecture of FIG. 3 according to the present invention.

We'll explain the decision sequence generating method of the present invention utilized in the signal processing architecture of FIG. 3. The method applies to both the first and the second embodiments mentioned above. FIG. 7 shows a flow chart of the decision sequence generating method for the signal processing architecture of FIG. 3 according to the present invention. The flow comprises steps of:

71 receiving and sending a chip of a codeword into the decision generator 34 and the codeword correlator 36;

72 checking if N chips of the codeword have been received;

73 generating a chip decision based on the received chip and sending the chip decision to the feedback filter 35 if M chips of the codeword have been received, and then returning to step 71, wherein M is less than N;

74 performing a codeword synthesis procedure based on N chips of the codeword to synthesize a codeword decision if the N chips of the codeword have been received; and

75 providing the codeword decision to the feedback filter 35 to replace the N−1 chip decisions sent previously in step 73.

The codeword synthesis procedure in step 74 comprises steps of:

(a) providing the N chips of the codeword to the codeword correlator 36 and calculating correlation between the codeword and any codeword of the codeword set;

(b) the peak detector 37 selecting a largest output from the codeword correlator 36; and (c) the decision generator 34 synthesizing the codeword decision based on the largest output from the peak detector 37.

In step (a), the codeword correlator 36 can employ FHT to calculate the correlation.

While the present invention has been shown and described with reference to two preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. A receiver for mitigating inter-chip interference and inter-symbol interference of transmitted data which is encoded into codewords in a multi-path channel, wherein each codeword is selected from a codeword set and comprises N chips, the receiver comprising:

a feed-forward filter for receiving and filtering a codeword of the transmitted data;

a codeword correlator coupled in a signal processing path with the feed-forward filter for calculating correlation between the received codeword and any codeword of the codeword set;

a peak detector, coupled to the codeword correlator, for selecting a maximum output from the codeword correlator;

a differential combiner, coupled to an output of the feed-forward filter and having an output coupled to the codeword correlator, for receiving a post-cursor representative echo signal as an estimate of the multi-path channel impulse response and for subtracting the post-cursor representative echo signal from the output of the feed-forward filter;

a decision generator, coupled to the peak detector and the codeword correlator, for generating N chip decisions corresponding to N chips of the received codeword and one codeword decision corresponding to the received codeword;

a feedback filter, coupled to the differential combiner and output of the decision generator, for generating the post-cursor representative echo signal based on the output of the decision generator; and wherein the decision generator provides a corresponding one of the N chip decisions to the feedback filter if the decision generator receives an i-th chip, i=1~N−1, of the received codeword, and provides the codeword decision to the feedback filter, if the decision generator receives an N-th chip of the received codeword, to replace the corresponding chip decisions sent to the feedback filter previously; and wherein the decision generator comprises:
  (i) a chip decision device for generating the corresponding chip decision if the decision generator receives the i-th chip, i=1~N−1, of the received codeword; and
  (ii) a codeword synthesis device for synthesizing the codeword decision if the decision generator receives the N-th chip of the received codeword; and wherein the feedback filter comprises:
  (i) M serially-connected taps delay line and M corresponding multipliers, wherein M is larger than N, and each of the M multipliers performs multiplication of a value of corresponding tap and an associated post-cursor channel coefficient;
  (ii) an adder, coupled to the M multipliers, for summing up outputs of all the M multipliers;
  (iii) a timing-adjusting unit for receiving the codeword decision from the codeword synthesis device and selecting N consecutive ones of the M taps to send N chips of the codeword decision respectively;
  (iv) M switches corresponding to the M taps for toggling between the delay line and the timing-adjusting unit; and
  (v) wherein the M switches turn to the delay line if the chip decision device generates the corresponding chip decision, and N ones of the M switches corresponding to the N consecutive taps turn to the timing-adjusting unit to send the N chips of the codeword decision into the N consecutive taps respectively if the codeword synthesis device synthesizes the codeword decision.

2. The receiver as recited in claim 1, the codeword correlator further comprising a fast Hadamard tranform (FHT) device.

3. The receiver as recited in claim 1, wherein the decision generator further comprises:
a switching device for toggling between the chip decision device and the codeword synthesis device, wherein the switching device turns to the chip decision device if the chip decision device generates the corresponding chip decision, and turns to the codeword synthesis device if the codeword synthesis device generates the codeword decision.

4. The receiver as recited in claim 1, wherein the feedback filter comprises:
M serially-connected taps delay line and M corresponding multipliers, wherein M is larger than N and each of the M multipliers performs multiplication of a value of corresponding tap and an associated post-cursor channel coefficient;

an adder, coupled to the M multipliers, for summing up outputs of all the M multipliers;

N switches corresponding to first N ones of the M taps for switching between the delay line and the switching device; and wherein the N switches turn to the delay line if the chip decision device generates the corresponding chip decision, and the N switches turn to the switching device to send N chips of the codeword decision into i-th tap, i=1~N respectively if the codeword synthesis device synthesizes the codeword decision.

5. A receiver for mitigating inter-chip interference and inter-symbol interference of transmitted data which is encoded into codewords in a multi-path channel, wherein each codeword is selected from a codeword set and comprises N chips, the receiver comprising:

a feed-forward filter for receiving and filtering a codeword of the transmitted data;

a codeword correlator coupled in a signal processing path with the feed-forward filter for calculating correlation between the received codeword and any codeword of the codeword set;

a peak detector, coupled to the codeword correlator, for selecting a maximum output from the codeword correlator;

a differential combiner, coupled to an output of the feed-forward filter and having an output coupled to the codeword correlator, for receiving a post-cursor representative echo signal as an estimate of the multi-path channel impulse response and for subtracting the post-cursor representative echo signal from the output of the feed-forward filter;

a decision generator, coupled to the peak detector and the codeword correlator, for generating N chip decisions corresponding to N chips of the received codeword and one codeword decision corresponding to the received codeword;

a feedback filter, coupled to the differential combiner and output of the decision generator, for generating the post-cursor representative echo signal based on the output of the decision generator; and wherein the decision generator provides a corresponding one of the N chip decisions to the feedback filter if the decision generator receives an i-th chip, i=1~N−1, of the received codeword, and provides the codeword decision to the feedback filter, if the decision generator receives an N-th chip of the received codeword, to replace the corresponding chip decisions sent to the feedback filter previously;

wherein the decision generator comprises:
  (i) a chip decision device for generating the corresponding chip decision if the decision generator receives the i-th chip, i=1~N−1, of the received codeword; and
  (ii) a codeword synthesis device for synthesizing the codeword decision if the decision generator receives the N-th chip of the received codeword; and
  (iii) a switching device for toggling between the chip decision device and the codeword synthesis device, wherein the switching device turns to the chip decision device if the chip decision device generates the corresponding chip decision, and turns to the codeword synthesis device if the codeword synthesis device generates the codeword decision.

6. The receiver as recited in claim 5, the codeword correlator further comprising a fast Hadamard transform (FHT) device.

7. The receiver as recited in claim 5, wherein the feedback filter comprises:
M serially-connected taps delay line and M corresponding multipliers, wherein M is larger than N and each of the M multipliers performs multiplication of a value of corresponding tap and an associated post-cursor channel coefficient;
an adder, coupled to the M multipliers, for summing up outputs of all the M multipliers;
N switches corresponding to first N ones of the M taps for switching between the delay line and the switching device; and
wherein the N switches turn to the delay line if the chip decision device generates the corresponding chip decision, and the N switches turn to the switching device to send N chips of the codeword decision into i-th tap, i=1~N respectively if the codeword synthesis device synthesizes the codeword decision.

8. The receiver as recited in claim 3, wherein the feedback filter comprises:
M serially-connected taps delay line and M corresponding multipliers, wherein M is larger than N, and each of the M multipliers performs multiplication of a value of corresponding tap and an associated post-cursor channel coefficient;
an adder, coupled to the M multipliers, for summing up outputs of all the M multipliers;
a timing-adjusting unit for receiving the codeword decision from the codeword synthesis device and selecting N consecutive ones of the M taps to send N chips of the codeword decision respectively;
M switches corresponding to the M taps for toggling between the delay line and the timing-adjusting unit; and
wherein the M switches turn to the delay line if the chip decision device generates the corresponding chip decision, and N ones of the M switches corresponding to the N consecutive taps turn to the timing-adjusting unit to send the N chips of the codeword decision into the N consecutive taps respectively if the codeword synthesis device synthesizes the codeword decision.

* * * * *